US012643292B2

(12) United States Patent
Peng et al.

(10) Patent No.: US 12,643,292 B2
(45) Date of Patent: Jun. 2, 2026

(54) POWDER SPREADING DEVICE, THREE-DIMENSIONAL PRINTING DEVICE, AND THREE-DIMENSIONAL PRINTING SYSTEM

(71) Applicant: KOCEL INTELLIGENT MACHINERY LIMITED, Yinchuan (CN)

(72) Inventors: Fan Peng, Yinchuan (CN); Yi Liu, Yinchuan (CN); Zhijun Zhou, Yinchuan (CN); Mengqing Yuan, Yinchuan (CN); Rui Ma, Yinchuan (CN); Guangning Ren, Yinchuan (CN); Guanlin Sun, Yinchuan (CN); Hengjia Mai, Yinchuan (CN); Wei Ma, Yinchuan (CN)

(73) Assignee: KOCEL INTELLIGENT MACHINERY LIMITED, Yinchuan (CN)

( * ) Notice: Subject to any disclaimer, the term of this patent is extended or adjusted under 35 U.S.C. 154(b) by 10 days.

(21) Appl. No.: 18/900,836

(22) Filed: Sep. 29, 2024

(65) Prior Publication Data

US 2025/0018652 A1     Jan. 16, 2025

Related U.S. Application Data

(63) Continuation of application No. PCT/CN2023/078024, filed on Feb. 24, 2023.

(30) Foreign Application Priority Data

May 30, 2022   (CN) .......................... 202210585699.7
May 30, 2022   (CN) .......................... 202221314042.9

(51) Int. Cl.
| | |
|---|---|
| *B29C 64/364* | (2017.01) |
| *B29C 64/153* | (2017.01) |
| *B29C 64/205* | (2017.01) |
| *B29C 64/218* | (2017.01) |

(Continued)

(52) U.S. Cl.
CPC .......... *B29C 64/364* (2017.08); *B29C 64/153* (2017.08); *B29C 64/205* (2017.08); *B29C 64/218* (2017.08); *B33Y 30/00* (2014.12); *B33Y 40/00* (2014.12)

(58) Field of Classification Search
CPC .... B29C 64/153; B29C 64/205; B29C 64/364
See application file for complete search history.

(56) References Cited

FOREIGN PATENT DOCUMENTS

| | | |
|---|---|---|
| CN | 101850619 A | 10/2010 |
| CN | 107718537 A | 2/2018 |
| CN | 109663919 A | 4/2019 |

(Continued)

*Primary Examiner* — James Sanders

(57) ABSTRACT

A powder spreading device includes a device body, an adjustment assembly, and a dust removing mechanism. The adjustment assembly is provided on the device body. The adjustment assembly is configured to orient to a powder spreading surface. A first end of the dust removing mechanism is provided on the device body. The first end of the dust removing mechanism is covered over the adjustment assembly. A second end of the dust removing mechanism is communicated to the first end of the dust removing mechanism. The second end of the dust removing mechanism is configured to extend to the device body. A three-dimensional (3D) printing device and a 3D printing system are further provided.

17 Claims, 13 Drawing Sheets

(51) Int. Cl.
    *B33Y 30/00*        (2015.01)
    *B33Y 40/00*        (2020.01)

(56)           References Cited

FOREIGN PATENT DOCUMENTS

| | | | |
|---|---|---|---|
| CN | 210359251 | U | 4/2020 |
| CN | 114889126 | A | 8/2022 |
| CN | 217531897 | U | 10/2022 |

421                    420                    422

610    600    400

420 610 400 600

POWDER SPREADING DEVICE, THREE-DIMENSIONAL PRINTING DEVICE, AND THREE-DIMENSIONAL PRINTING SYSTEM

CROSS-REFERENCE TO RELATED APPLICATIONS

This application is a continuation of International Patent Application No. PCT/CN2023/078024, filed on Feb. 24, 2023, which claims the benefit of priority from Chinese Patent Application Nos. 202210585699.7 and 202221314042.9, both filed on May 30, 2022. The content of the aforementioned application, including any intervening amendments thereto, is incorporated herein by reference in its entirety.

TECHNICAL FIELD

This application relates to three-dimensional (3D) printing equipment, and more particularly to a powder spreading device, a 3D printing device, and a 3D printing system.

BACKGROUND

With the continuous development of industry, 3D sand printing technology for casting mold is gradually matured. In the 3D sand printing method, a layer of powder is laid uniformly on a platform, a print head scans and sprays a liquid material in a specific area to make the sprayed powder bonded together, and the platform drops a certain distance; and repeat the above steps until all the layers of the powder completes printing.

For three-dimensional printing (3DP) printer, granular materials are added firstly to a powder spreader, the powder spreader spreads a layer of powder materials on a lifting base plate, then a scraper smooths the powder, and finally the nozzle, in accordance with a shape of a prototype cross-section, sprays selectively bonded materials to the spread powder, so that the powder in an entity region of the prototype cross-section bonds together to form a cross-section profile, and a layer of the printing is completed. After a layer of printing, the working table descends the height of a cross-section, and then repeat the above steps until the prototype printing is completed, so that printing layer by layer molds a required workpiece. However, in the current printing method, the dust caused by laying powder cannot be effectively removed, which will cause the concentration of powder on the powder surface increase, thereby causing dust explosion.

SUMMARY

In view of the deficiencies in the prior art, this application provides a powder spreading device, a 3D printing device, and a 3D printing system which solves the problem that the dust generated by the adjustment assembly in the current powder laying process easily causes explosion.

Technical solutions of this application are described as follows.

In a first aspect, this application provides a powder spreading device including a device body, an adjustment assembly and a dust removing mechanism; the adjustment assembly is provided on the device body; the adjustment assembly is configured to orient to a powder spreading surface; a first end of the dust removing mechanism is provided on the device body; the first end of the dust removing mechanism is covered over the adjustment assembly; a second end of the dust removing mechanism is communicated to the first end of the dust removing mechanism; the second end of the dust removing mechanism is configured to extend out of the device body; and the dust removing mechanism includes a dust collection hood; the device body is provided with an opening opposite to the adjustment assembly; the dust collection hood is provided over the opening; and the dust collection hood is configured to extend towards the adjustment assembly through the opening.

In a second aspect, this application further provides a 3D printing device including the powder spreading device as described above.

In a third aspect, this application further provides a 3D printing system including the 3D printing device described above.

This application has the following beneficial effects.

In the powder spreading device, a dust removing mechanism is provided on the adjustment assembly so as to suck the raised dust to outside the device body, so that the raised dust generated by laying the powder can be effectively removed, thereby avoiding the concentration of the raised dust on the powder surface from being too high in the printing process, and preventing the risk of powder explosion to improve the safety performance. At the same time, the powder spreading device also has better laying powder effect, so as to improve the printing efficiency and ensure the printing quality.

100—device body; 110—opening; 120—powder spreading surface; 200—adjustment assembly; 210—compaction member; 220—leveling member; 230—drive member;

240—transmission member; 250—compacting plate; 260—adjustment member; 300—dust removing mechanism; 310—dust collection hood; 320—dust collector pipe; 330—dust collector; 331—negative pressure section; 332—first collecting portion; 333—second collecting portion; 400—feeding mechanism; 410—powder trough; 411—powder inlet mouth; 420—feeding portion; 421—first section; 422—second section; 430—powder outlet mouth; 500—sieve mesh; 600—roller screen; 610—vibrating ball; 700—print head mechanism; 710—housing; 711—exhaust portion; 712—equalizing device; 713—accommodating cavity; 714—particle separating device; 715—refrigeration device; 720—gas source processing mechanism; 800—working box; 810—printing base plate; and 900—lifting mechanism.

DETAILED DESCRIPTION OF EMBODIMENTS

The disclosure will be further described in detail below with reference to the embodiments and accompanying drawings to facilitate the understanding and implementation of the technical solutions of the disclosure. Described below are merely preferred embodiments of the disclosure. However, the disclosure may also be implemented in other ways different from those described herein. It should be understood that the embodiments described herein are only used to illustrate and explain this application, which are not intended to limit the disclosure.

Figure 1:
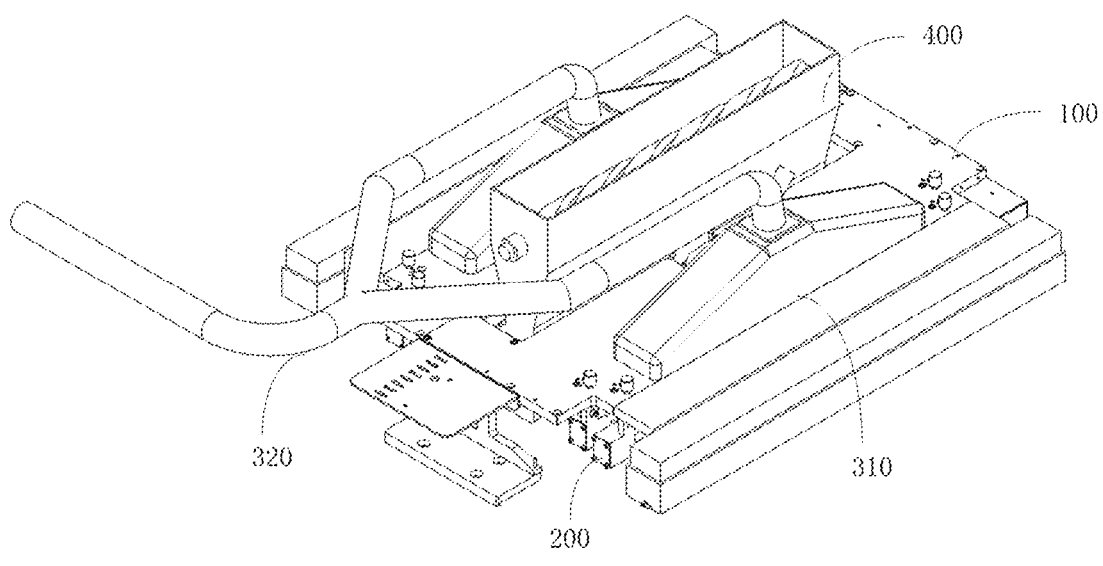
FIG. 1 is a schematic diagram of a partial structure of a powder spreading device according to one embodiment of the present disclosure.
Figure 2:
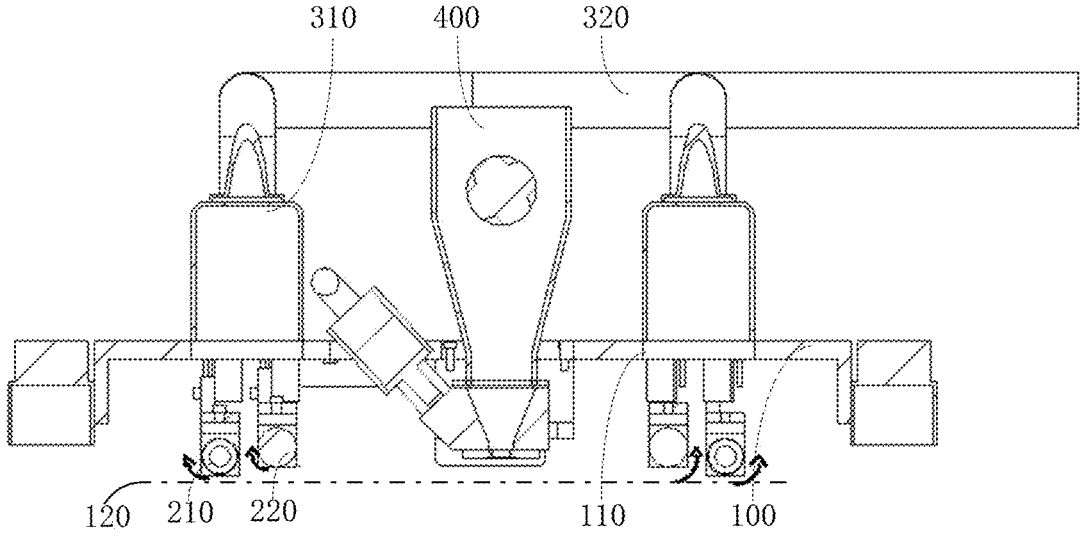
FIG. 2 is a partial sectional view of FIG. 1.
Figure 3:
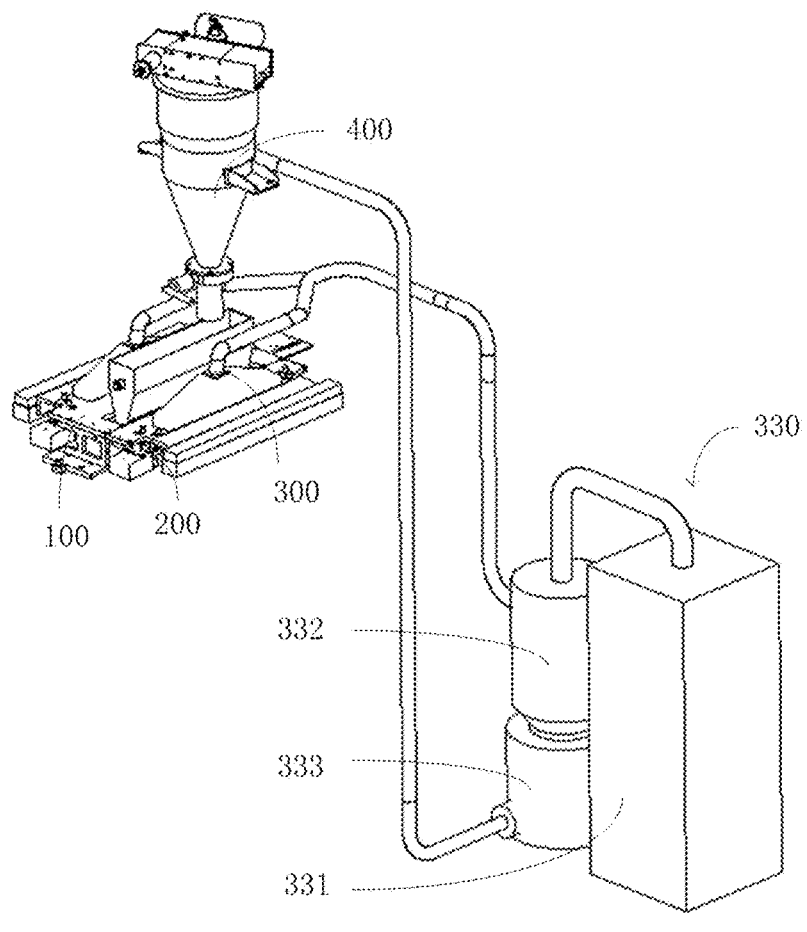
FIG. 3 is a schematic diagram of a powder spreading device according to one embodiment of the present disclosure.

As shown in FIGS. 1-3, a powder spreading device includes a device body 100, an adjustment assembly 200, and a dust removing mechanism 300.

The device body 100 is the main part of the powder spreading device. The device body 100 can provide a mounting position for other parts of the powder spreading device. In the powder spreading process, the device body 100 drives the other parts of the powder spreading device to move, so as to realize the powder spreading operation.

The adjustment assembly 200 is provided on the device body 100, and the adjustment assembly 200 is oriented toward the powder spreading surface 120. When the powder spreading operation is carried out, the adjustment assembly 200 follows the spread powder, so as to scrape or compact the powder surface of each layer to ensure the uniformity of the powder surface of each layer, thereby ensuring the printing quality.

A first end of the dust removing mechanism 300 is provided on the device body 100, and the first end of the dust removing mechanism 300 is provided over the adjustment assembly 200. A second end of the dust removing mechanism 300 is communicated to the first end of the dust removing mechanism 300. The second end of the dust removing mechanism 300 extends beyond the device body 100. In the specific working process, when the adjustment assembly 200 scrapes or compacts the powder surface, dust will inevitably be raised, and at this time, the raised dust floats upwardly to enter the first end of the dust removing mechanism 300 covered on the adjustment assembly 200, and then be discharged outside the device body 100 through the second end of the dust removing mechanism 300.

In the powder spreading device, the dust removing mechanism 300 is provided on the adjustment assembly 200 so as to suck the raised dust to outside the device body 100, so that the raised dust generated by laying the powder can be effectively removed, thereby avoiding the concentration of the raised dust on the powder surface from being too high in the printing process, and preventing the risk of powder explosion to improve the safety performance. At the same time, the powder spreading device also has better laying powder effect, so as to improve the printing efficiency and ensure the printing quality.

In the embodiments, the dust removing mechanism 300 may have various specific structures. In an optional embodiment, the dust removing mechanism 300 includes a dust collection hood 310 and a dust collector pipe 320. The dust collection hood 310 is covered on the adjustment assembly 200. At the same time, in order to facilitate the installation, the dust collection hood 310 is disposed on the upper side of the device body 100, and the adjustment assembly 200 is disposed on the lower side of the device body 100. The dust collection hood 310 is positioned opposite to the adjustment assembly 200, so that the dust raised by the adjustment assembly 200 while working can float into the dust collection hood 310.

Further, one end of the dust collector pipe 320 is communicated to the dust collection hood 310, and the other end of the dust collector pipe 320 extends beyond the device body 100, so that the dust entering the dust collection hood 310 is discharged beyond the device body 100 through the dust collector pipe 320. This method is simple in structure, easy to install, and has a lower assembly cost, and can make the structure of the powder spreading device more compact.

In order to make the dust removal effect better, the cross-section of the dust collection hood 310 can be gradually reduced in a direction away from the adjustment assembly 200, which can facilitate the circulation of dust and obtain a better dust removal effect. Of course, the dust collection hood 310 and the dust collector pipe 320 is connected by bonding, welding, or threaded connection, but not limit it.

In order to make the dust collection hood 310 have a better dust removal effect, the device body 100 is provided with an opening 110 opposite to the adjustment assembly 200 so that the working part of the adjustment assembly 200 can be directly seen through the opening 110. The dust collection hood 310 is covered over the opening 110, in other words, the dust collection hood 310 covers the adjustment assembly 200. This way can not only make the dust collection hood 310 achieve a better dust removal effect, but also make the installation effect of the dust collection hood 310 better and make the dust collection hood 310 take up less space, so as to make the assembly effect of the whole powder spreading device better.

In general, most of the dust raised by the device body 100 is raised by the work of the adjustment assembly. Therefore, in an optional embodiment, the dust collection hood 310 may pass through the opening 110 and extend towards the adjustment assembly 200, so that the dust collection hood 310 may be provided over most of the adjustment assembly 200, so that most of the dust raised by the adjustment assembly 200 is discharged to the device body 100 through the dust removing mechanism 300, thereby ensuring cleanliness within the device body 100.

In an embodiment, the dust removing mechanism 300 includes a dust collector 330, which is connected to the dust collection hood 310 through the dust collector pipe 320. In this case, the dust collector 330 can provide negative pressure for the dust collection hood 310, so that the dust can be adsorbed out more easily, which in turn can improve the dust removal efficiency, and facilitate the recovery of the dust through the dust collector 330.

In an embodiment, the powder spreading device includes a feeding mechanism 400. The feeding mechanism 400 is used to provide powder so as to ensure the powder spreading operation. The dust collector 330 includes a negative pressure portion 331, a first collecting portion 332, and a second collecting portion 333 connected in turn. The negative pressure portion 331 is used to provide a negative pressure for the first collecting portion 332, so as to ensure normal vacuuming operation within the device body 100. The second collecting portion 333 is connected to the feeding mechanism 400. In this embodiment, in the specific work process, the first collecting portion 332 is used for vacuuming operation through the negative pressure section 331, and then the dust collected in the first collecting portion 332 is transported to the second collecting portion 333, and then transported to the feeding mechanism 400 to realize recycling of the powder materials, so as to ensure the safety of the work and make the powder spreading environmentally friendly and economical.

Of course, the second collecting portion 333 and the feeding mechanism 400 may be connected by a pipe, thereby facilitating the assembly and layout of each component. In an embodiment, both the dust collector pipe 320 and one end of the pipe may be a flexible pipe or a telescopic pipe, thereby preventing the associated pipe from affecting the movement of the powder laying.

Moreover, during the assembly of the first collecting portion 332 and the second collecting portion 333, the first collecting portion 332 may be disposed on the second collecting portion 333 so as to facilitate transportation of the dust in the first collecting portion 332 to the second collecting portion 333. Accordingly, in an optional embodiment, a filter member is provided between the first collecting portion 332 and the second collecting portion 333 to filter out impurities in the raised dust, so as to make the dust conveyed into the second collecting portion 333 usable. In another optional embodiment, a filter member is provided in the feeding mechanism 400, so that the dust entering the feeding mechanism 400 is filtered first and then conveyed into the chamber for the powder laying operation to ensure the printing quality.

In an embodiment, the feeding mechanism 400 is provided with a negative pressure member which provides negative pressure so that the dust in the second collecting portion 333 can be more easily transported to the feeding mechanism 400, thereby facilitating recyclable recovery and utilization of the dust.

In an embodiment, in order to ensure the recycling quality of the dust, the dust collector 330 includes a gas-solid separation portion. The gas-solid separation portion is connected to the first collecting portion 332, and the gas-solid separation portion is used to carry out gas-solid separation of the powder. At this time, when the dust reaches the first collecting portion 332, the gas-solid separation portion works, so that the gas in the dust is sucked out, and the dust falls into the second collecting portion 333 under the force of gravity, thereby realizing effective recovery of the dust, and improving the recovery efficiency of the dust, which ultimately facilitates the recyclable recovery and utilization of the dust.

In an embodiment, the number of adjustment assemblies 200 is two. The two adjustment assemblies 200 are disposed on both sides of the device body 100, respectively. The two adjustment assemblies 200 are covered with the dust removing mechanism 300, as shown in FIG. 3. This way makes the powder spreading device realize two-way powder spreading. In the work of the powder spreading device, when the powder spreading device spreads powder in one direction, one of the two adjustment assemblies 200 scrapes or compacts the powder surface, and when the powder spreading device spreads powder in the other direction, the other of two adjustment assemblies 200 scrapes or compacts the powder surface, and furthermore, the dust removing mechanism 300 removes dust from the two adjustment assemblies 200 to ensure the effect of dust removal. This way can improve the effect of spreading powder to ensure the promised efficiency. Of course, it is also possible that the device body 100 are provided with a plurality of adjustment assemblies 200 according to specific circumstances, and each adjustment assembly 200 may be covered with the dust removing mechanism 300 to improve the printing efficiency.

In an embodiment, the powder spreading device further includes a feeding mechanism 400. The feeding mechanism 400 is provided on the device body 100, and the feeding mechanism 400 is between the two adjustment assemblies 200 for powder spreading operations. In this embodiment, when the bidirectional powder spreading operation is carried out, the bidirectional powder spreading operation can be completed by only one feeding mechanism 400 to improve the work efficiency, and a better compactness of the powder spreading device can be ensured, which is convenient for the layout of the various components.

In an embodiment, the powder spreading device further include a feeding mechanism 400. The number of the feeding mechanism 400 is two. The two feeding mechanisms 400 are disposed on the device body 100, and the two feeding mechanisms 400 carries out the powder spreading operation in two directions respectively, so as to improve the working efficiency.

In the specific arrangement, the two feeding mechanisms 400 are respectively provided on both sides of the two adjustment assemblies 200. Or, the two feeding mechanisms 400 are spaced apart between the two adjustment assemblies 200. Or, in the direction of spreading powder, the feeding mechanisms 400 and the adjustment assemblies 200 are cross-distributed. The arrangement of the feeding mechanism 400 and the adjustment assembly 200 is not limited to it.

In an embodiment, the adjustment assembly 200 includes a compaction member 210 and a leveling member 220. The compaction member 210 and the leveling member 220 are spaced apart sequentially in the powder spreading direction. In this embodiment, when the powder spreading operation is carried out, the feeding mechanism 400 includes a powder trough 410. The powder trough 410 is provided with a powder outlet mouth 430 facing the powder surface. In the powder spreading direction, the powder in the powder trough 410 falls to the working table through the powder outlet mouth 430, and the leveling member 220 and the compaction member 210 sequentially follow the operation. The leveling member 220 is used to flatten the powder falling from the powder trough 410 to form the uniform powder surface. The compaction member 210 is used to compact the powder surface that is scraped flat by the leveling member 220 to improve the density of the powder surface, thereby ensuring the print quality.

Specifically, the compaction member 210 and the leveling member 220 can be various. For example, the leveling member 220 is a scraper, a hairbrush, a toothed brush, and a first roller, and the compaction member 210 is a second roller or a pressing plate. In an embodiment, the compaction member 210 and the leveling member 220 are both the roller, so as to ensure the uniformity of the powder surface while ensuring the powder spreading device to operate better. Moreover, in the specific assembly process, the distance between the compaction member 210 and the powder spreading surface 120 is slightly smaller than the distance between the leveling member 220 and the powder spreading surface 120, so as to play a better leveling and compaction role to better ensure the printing quality.

In an embodiment, the circumferential surface of the first and second rollers is uneven. Specifically, the circumferential surface of the roller has a certain roughness. The surface roughness of the circumferential surface of the roller is low, which can make the roller's powder rolling effect better to ensure the uniformity of the powder spreading surface 120. Optionally, the surface roughness of the circumferential surface of the roller is lower than Ra3.2, so that the leveling effect of the powdered surface is better.

The circumferential surface of the first and second rollers can be molded by means of machining, 3D printing molding, casting, or shot blasting. In order to increase the roughness of the rollers, the rollers can be obtained using various ways, for example, a. the roller is machined with features such as knife patterns on the surface; b. a rough surface similar to the desired rollers is printed by the 3D printing technology; and c. the surface of the roller is subjected to shot blasting technology to create surface patterns in order to achieve the desired surface roughness. At the same time, the rollers are molded by means of various methods, for example, mono-structure molding or similar structure of multi-structure combination molding.

In some embodiments, when assembled, the set of adjustment assemblies 200 may include a plurality of compaction members 210 and a plurality of leveling members 220 to perform the scraping and compaction operation better.

Figure 4:
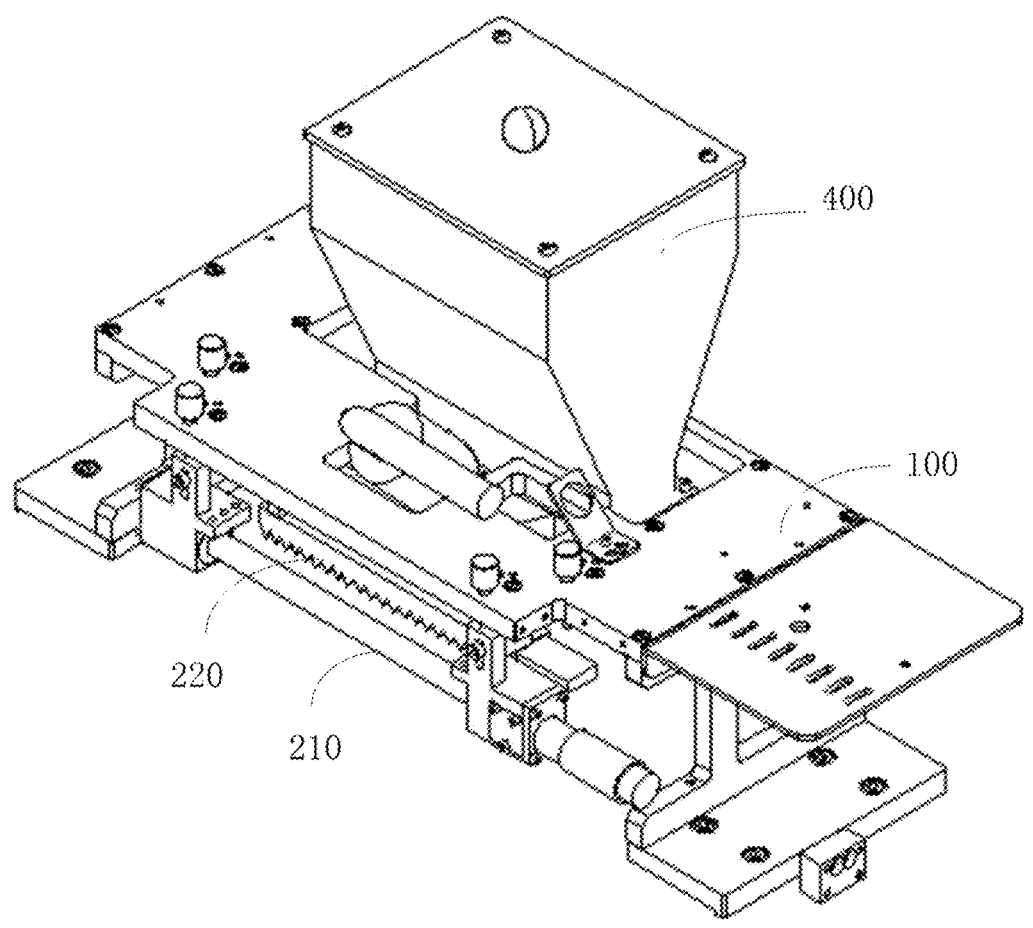
FIG. 4 is a schematic diagram of a partial structure of another powder spreading device according to one embodiment of the present disclosure.

In an embodiment, the compaction member 210 is a roller, and the leveling member 220 is one of a scraper, a toothed member, and a brush member. As shown in FIG. 4. the roller may have structure and be molded in the molding method in the above embodiment. In the process of laying the powder, the powder spreading surface 120 is not only scraped and compacted by the leveling member 220, but also rolled and pressed by the compaction member 210, in order to make the density uniformity and densification of each layer of the powder spreading surface 120 better. Compared to the existing powder spreading mechanism with a single scraper or a single roller, the powder spreading mechanism in the disclosure has a higher compactness degree of each layer of powder spreading surface 120, thereby obtaining the printed product with a better quality.

In an embodiment, the compaction member 210 is a roller, and the leveling member 220 is a scraper. In the connection process, a first side of the scraper is connected to the bottom of the device body 100, and a second side of the scraper faces the powder spreading surface 120 to scrap the powder spreading surface 120. In this embodiment, the leveling member 220 has simple structure, easy to install, and easy to manufacture. Accordingly, to ensure the scraping and leveling effect on the powder spreading surface 120, the first side of the scraper is detachably connected to the bottom of the device body 100. Besides, a plurality of scrapers of different specifications may be provided. The scrapers of different specifications are replaced according to the specific situation, thereby making the leveling member 220 more practical and realizing a better effect of the powder spreading.

In an embodiment, the compaction member 210 is a roller, and the leveling member 220 is a toothed member. An engagement portion of the toothed member faces the powder spreading surface 120. The toothed member includes a mounting frame and an engagement portion disposed on the mounting frame. The toothed member is assembled on the device body 100 via the mounting frame. During the working process, the plurality of engagement teeth continuously distributed contacts with the powder layer, thereby scraping the powder. This way can have a better scraping effect on the powder layer, so that the concave and convex positions on the powder spreading surface 120 can be scraped more easily, so as to facilitate the roller pressing effect of the subsequent compaction member 210.

In an embodiment, the compaction member 210 is a roller, and the leveling member 220 is a brush member. The brush portion of the brush member faces towards the powder spreading surface 120. In this embodiment, in the specific working process, the brush portion can scrape the powder spreading surface 120 to make the powder spreading surface 120 more level, thereby improving the density uniformity of the powder layer.

Figure 5:
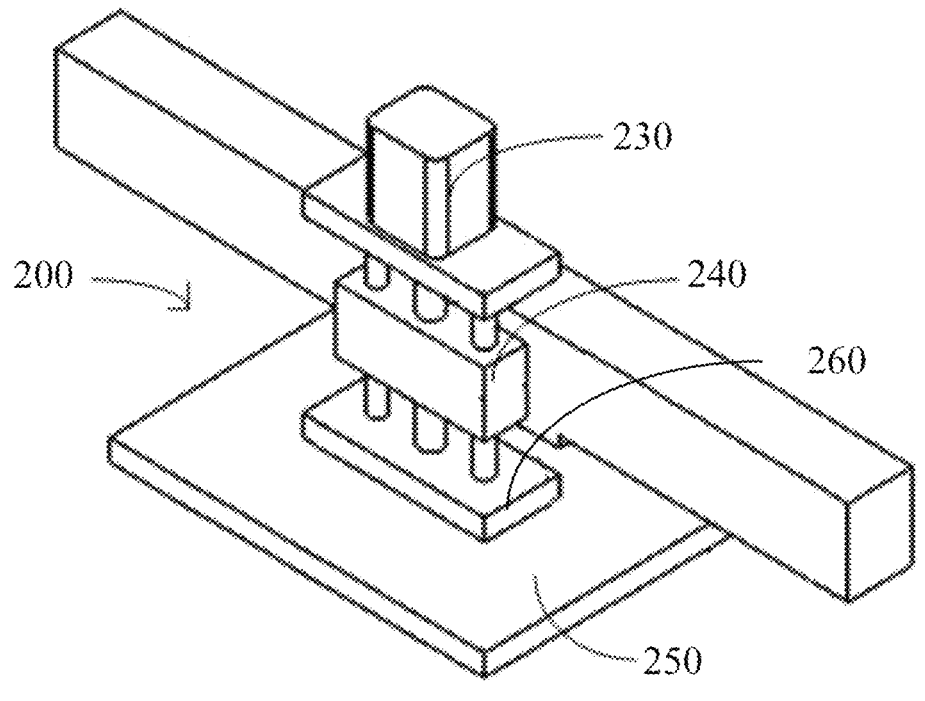
FIG. 5 is a schematic diagram of an adjustment assembly according to one embodiment of the present disclosure.

In an embodiment, the adjustment assembly 200 may be other mechanisms. Specifically, the adjustment assembly 200 includes a drive member 230, a transmission member 240, and a compacting plate 250. The drive member 230 is disposed on the device body 100. The first side of the compacting plate 250 is driven with the drive member 230 via the transmission member 240. The second side of the compacting plate 250 faces the powder spreading surface 120, as shown in FIG. 5. The drive member 230 drives the compacting plate 250 in a direction toward or away from the powder spreading surface 120 through the transmission member 240. In the application process, when the device body 100 drives the adjustment assembly 200 to move, firstly, the flour spreading operation is performed, and then the drive member 230 drives the compacting plate 250 toward the powder spreading surface 120 to move to press the powder spreading surface 120 so as to make the thickness of the powder spreading surface 120 become smaller, thereby increasing the density of the powder spreading surface 120 to make the powder spreading surface 120 more compact. To ensure the flatness of the powder spreading surface 120, the second side surface of the compacting plate 250 is a polished surface, so as to ensure that the pressed powder spreading surface 120 is flatter.

In the process of spreading power by the powder spreading device, the drive member 230 drives the compacting plate 250 to move towards the powder spreading surface 120, so that the compacting plate 250 presses the powder spreading surface 120, so as to make the powder spreading surface 120 gradually become denser, thereby ensuring that each layer of the powder spreading surface 120 better compactness. Compared to the existing powder spreading process, this way not only makes the tightness of each layer of the powder spreading surface 120 better, but also improves the flatness of the powder spreading surface 120, thereby facilitating laying the powder on the next layer, ensuring a better uniformity of the powder surface, and improving the quality of the printed product.

In an embodiment, the adjustment assembly 200 further includes an adjustment member 260. The first side of the compacting plate 250 is connected to the transmission member 240 via the adjustment member 260. The adjustment member 260 is configured to adjust the second side of the compacting plate 250 parallel to the powder spreading surface 120. In this embodiment, the second side of the compacting plate 250 is first detected to be parallel to the powder spreading surface 120, and then the facing direction of the compacting plate 250 is adjusted by the adjustment member 260, so that the second side of the compacting plate 250 is parallel to the powder spreading surface 120, thereby making the pressing effect of the compacting plate 250 on the powder spreading surface 120 better, and facilitating the subsequent powder spreading to ensure the printing quality.

Of course, the adjustment member 260 is an automatic adjustment member 260 or a manual adjustment member 260, but not limited to it.

In an embodiment, the powder spreading device further includes a feeding mechanism 400. The feeding mechanism 400 includes a powder trough 410 and a feeding portion 420. The feeding portion 420 is provided in the powder trough 410. A powder inlet mouth 411 faces the feeding portion 420, so that the powder conveyed to the powder trough 410 firstly falls into the feeding portion 420. The feeding portion 420 is disposed opposite to a powder outlet mouth 430 of the powder trough 410. In the working process, the powder that falls into the feeding portion 420 can be better discharged from the feeding portion 420 through the movement of the feeding portion 420, then dropped into the powder outlet mouth 430 opposite to the feeding portion 420, and is ultimately spread. This arrangement not only makes the unloading efficiency of the powder, but also prevents the powder from bonding in the powder trough 410 and affecting the effect of spreading powder.

Figure 7:
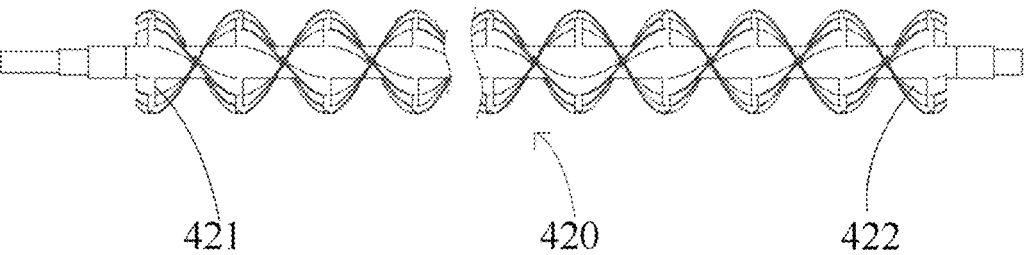
FIG. 7 is a schematic diagram of a feeding portion according to one embodiment of the present disclosure.

The feeding portion 420 may include a variety of specific structures, such as a scraper member, a vibrating member, or a comb member. In an embodiment, referring to FIG. 7, the feeding portion 420 is a spiral member. The spiral member is rotatably disposed in the powder trough 410. The spiral member extends along the lengthwise direction of the powder outlet mouth 430. In this embodiment, the spiral member rotates to drive the powder to move, which can transport the powder easier to the powder outlet mouth 430 opposite to the feeding portion 420, and ultimately realize the effect of spreading the powder. This arrangement not only improves the unloading efficiency of the powder, but also prevents the powder from bonding in the powder trough 410 and affects the spreading effect of the powder. During installation, a drive is provided on one side of the device body 100, and the drive is rotationally connected to the spiral member.

In an embodiment, the spiral member includes a first section 421 and a second section 422 connected to each other. The spiral directions of the first section 421 and the second section 422 are opposite. In other words, the spiral directions of the helical blades on the connected first and second sections of the spiral member are opposite. The powder inlet mouth 411 faces the junction of the first section 421 and the second section 422. In this embodiment, when the powder is conveyed to the junction of the first section 421 and the second section 422, the first section 421 and the second section 422 with opposite spiral directions convey the powder along the two ends of the spiral member, respectively, so that the powder conveyed to the powder outlet mouth 430 can be spread along the lengthwise direction of the powder outlet mouth 430, thereby ensuring the spreading width of the powder and improving the uniformity of the powder spreading.

In an embodiment, the spiral member includes a rotor shaft, a first spiral blade and a second spiral blade. The first spiral blade and the second spiral blade are both helically disposed on the rotor shaft. The first spiral blade and the second spiral blade both extend along the lengthwise direction of the rotor shaft. The spiral directions of the first spiral blade and the second spiral blade are opposite. The spiral member molded in this manner has two spiral blades stacked and in opposite spiral directions. During rotation, the powder in the powder trough 410 can be better spread evenly along the lengthwise direction of the spiral member, thereby ensuring that the powder conveyed to the powder outlet mouth 430 can be spread evenly along the lengthwise direction of the powder outlet mouth 430, so as to improve the spreading uniformity of the powder. Of course, the specific structure of the feeding portion 420 may be various, not limited to the embodiments in this disclosure.

Figure 6:
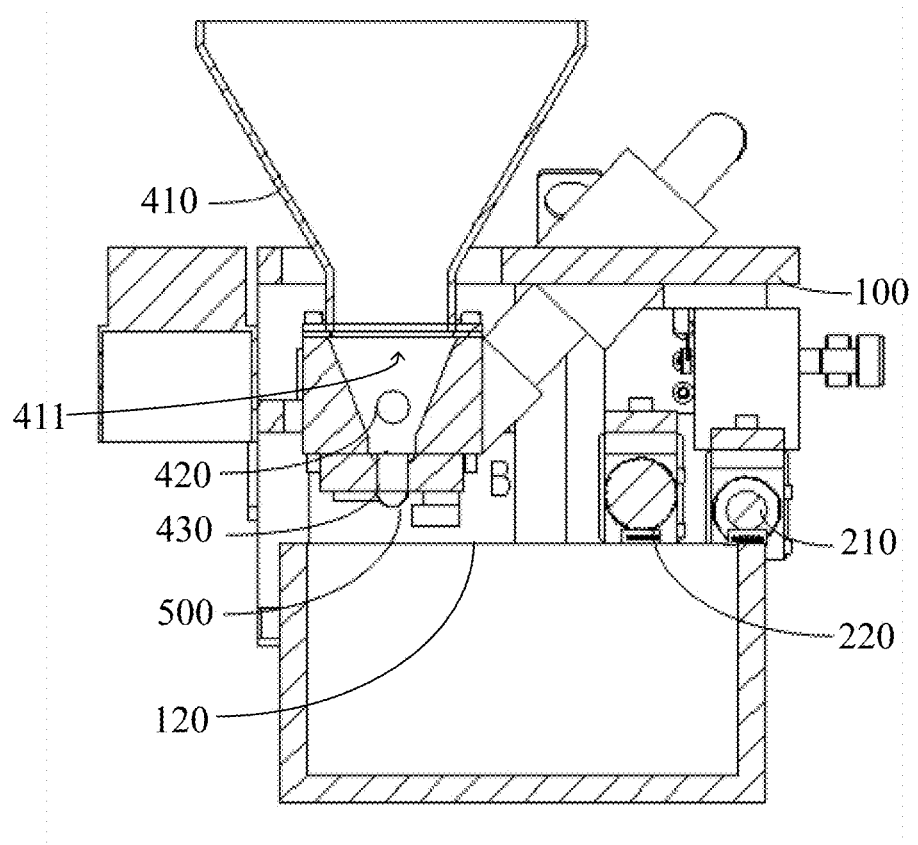
FIG. 6 is a schematic diagram of a partial structure of another powder spreading device according to one embodiment of the present disclosure.

In other embodiments, the feeding mechanism 400 also include other structures, as shown in FIG. 6. Specifically, the feeding mechanism 400 is provided with the powder outlet mouth 430 facing the powder spreading surface 120. The powder outlet mouth 430 is provided with a sieve mesh 500. The powder outlet mouth 430 is covered by the sieve mesh 500, so that the powder in the feeding mechanism 400 first passes through the sieve mesh 500 before being laid on the powder spreading surface 120. In this way, the powder is evenly spread on the powder spreading surface 120 through the sieve mesh 500 to improve the spreading quality of the powder.

In an embodiment, the sieve mesh 500 is swingably disposed at the powder outlet mouth 430. The sieve mesh 500 can swing by a driving mechanism. In a specific working process, the driving mechanism drives the sieve mesh 500 to swing at a certain angle, so as to sieve the powder in the sieve mesh 500, so that the powder in the sieve mesh 500 will fall onto the powder spreading surface 120 through the mesh holes on the sieve mesh 500 more quickly, so as to spread the powder. This method can improve the spreading efficiency of the powder and prevent the mesh holes of the sieve mesh 500 from blocking, thereby ensuring the spreading quality of the powder. Compared to the existing powder spreading mechanism, the powder spreading device is not only cleverly designed and simple in structure, with lower manufacturing cost, but also can produce a good spreading effect of the powder to ensure the printing quality.

Specifically, the driving mechanism can be various, for example, the driving mechanism is a telescopic motor to drive the sieve mesh 500 to oscillate, and or a crank linkage mechanism or a cam linkage mechanism, but not limited to it.

In an embodiment, the sieve mesh 500 is a flat structural member for easy installation. Or, the sieve mesh 500 is a curved structural member. The concave surface of the curved structural member faces the powder outlet mouth 430. Such a shape of the sieve mesh 500 can play a better sieving effect on the powder, and also can make the powder fall more uniformly through the curved structure to improve the spreading effect of the powder.

The sieve mesh 500 can be a semi-arc-shaped structural member. The concave surface of the semi-arc-shaped structural member faces the powder spreading surface 120, or faces the powder inlet mouth 411. The sieve mesh 500 may also be a closed structural member. The cross-sectional area of the sieve mesh 500 in the vertical direction is an oblong hole shape. Of course, the specific structure of the sieve mesh 500 does not limit these.

The shape of the mesh on the sieve mesh 500 is square, round, or waist-type. In the process of fabricating the sieve mesh 500, the sieve mesh 500 is formed by machining and carving a curved piece, or the sieve mesh 500 is directly fabricated. Moreover, the sieve mesh 500 is a one-piece structural member, or a structural member formed by splicing a plurality of sheets.

In an embodiment, the sieve mesh 500 is a flexible member. The sieve mesh 500 itself has a flexible characteristic, so that while the driving mechanism drives the sieve mesh 500 to swing, the unfixed portion of the sieve mesh 500 produces a tilting micro-angled vibration, so as to make the powder on the surface of the powder loosened, naturally fall, and spill onto the powder surface, so as to improve the spreading efficiency of the powder.

In an embodiment, the cross-section of the sieve mesh 500 is curved. The size of the mesh holes is gradually increased in the extending direction from the bottom of the sieve mesh 500 to both sides of the sieve mesh 500. Alternatively, the number of mesh holes is gradually increased in the extending direction of from the bottom of the sieve mesh 500 to both sides of the sieve mesh 500. Alternatively, the size of the mesh holes is gradually increased in the extending direction from the bottom of the sieve mesh 500 to both sides of the sieve mesh 500, and the number of mesh holes is gradually increased. In this way, the falling efficiency of the powder is higher to ensure the spreading effect of the powder.

Figure 8:
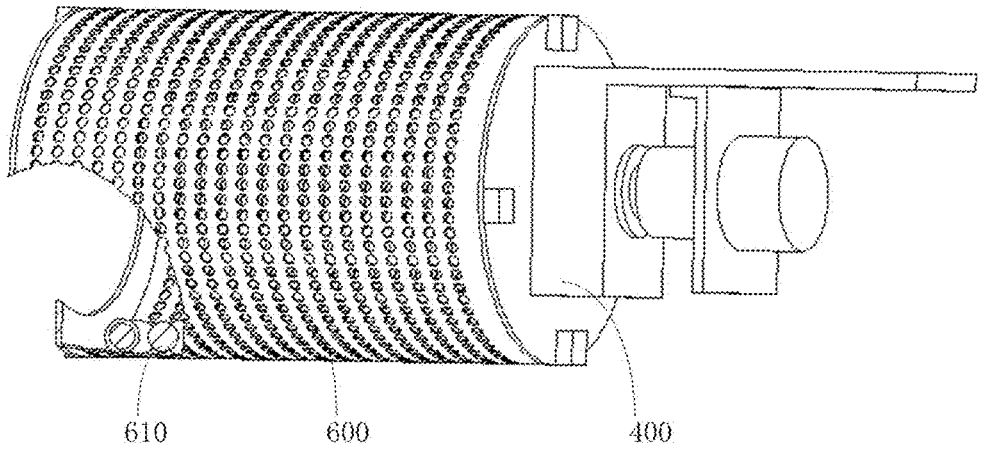
FIG. 8 is a schematic diagram of a partial structure of the powder spreading device with a roller screen according to one embodiment of the present disclosure.
Figure 9:
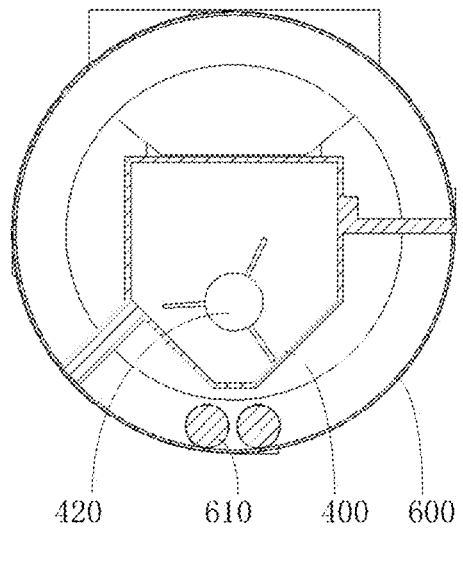
FIG. 9 is a sectional view of FIG. 8.

In an embodiment, the powder spreading device further includes a roller screen 600 and a feeding mechanism 400. Referring to FIGS. 8-9, the roller screen 600 is movably disposed on the device body 100. The roller screen 600 faces the powder spreading surface 120. The feeding mechanism 400 is used to feed the powder material into the roller screen 600. The roller screen 600 is movable so that the powder material conveyed into the roller screen 600 by the feeding mechanism 400 is laid on the powder spreading surface 120. In this embodiment, through the rolling or oscillating action of the roller screen 600, the powder conveyed to the roller screen 600 can be evenly dispersed therein, and furthermore, the lumps in the powder can be dispersed. Then, the powder is spread on the powder spreading surface 120 through the mesh holes of the roller screen 600. Compared to existing powder spreading mechanism, the powder spreading mechanism can make the powder spread more evenly and avoid the problem of pulling and pushing sand. Moreover, the mesh number and rotational speed of the roller screen 600 can be adjusted to control the amount of powder to be laid, which in turn improves the practicability.

In an embodiment, the roller screen 600 is rolled on the device body 100. The roller screen 600 is rolled to spread the powder on the powder spreading surface 120. In this embodiment, the rolling of the roller screen 600 allows the powder conveyed into the roller screen 600 to be evenly dispersed therein, and lumps in the powder to be dispersed, and then the powder is spread onto the powder spreading surface 120 through the mesh holes of the roller screen 600.

In an embodiment, a plurality of vibrating balls 610 are provided in the roller screen 600. In this embodiment, during the rotation of the roller screen 600, the vibrating balls 610 jump inside the roller screen 600, so as to provide a vibrating force for the roller screen 600 through contacting with the roller screen 600, and then bounce the blocked mesh holes to ensure the laying efficiency of the powder. Moreover, the vibrating ball 610 is an elastic ball, thereby ensuring the vibration effect. Of course, the roller screen 600 also is connected to other vibration mechanisms, such as a vibrator, to prevent the phenomenon of blocked mesh holes. However, the specific vibration mechanisms do not limit to it.

In an embodiment, the roller screen 600 is provided with a plurality of baffles extending along a lengthwise direction thereof. The plurality of baffles divide the roller screen 600 into a plurality of independent chambers. The plurality of independent chambers hold different kinds of powder. The feeding mechanism 400 is used to feed the powder into different chambers. When the corresponding chamber faces the powder spreading surface 120, the roller screen 600 oscillates to spread the powder in the corresponding chamber on the powder spreading surface 120, thereby realizing the powder spreading effect. In this embodiment, a plurality of independent chambers for storing powder can store a variety of powders inside the roller screen 600 at the same time, so that when laying the powder, the powder can be selected, thus improving the work efficiency.

Specifically, the plurality of independent chambers may include a common powder chamber and a mixed powder chamber. When mixing powder and laying powder, the proportion of the common powder and special powder can be selected, which ensures the quality of the printed product while avoiding the waste of special powder, thereby reducing the production cost. Compared to the prior art, when replacing the powder and mixing the powder, the step of returning the roller screen 600 to the powder adding device to add powder is eliminated, which improves work efficiency.

Based on the powder spreading device disclosed in all the embodiments above, this disclosure further provides a 3D printing device including the powder spreading device described in any one of the embodiments above.

Figure 10:
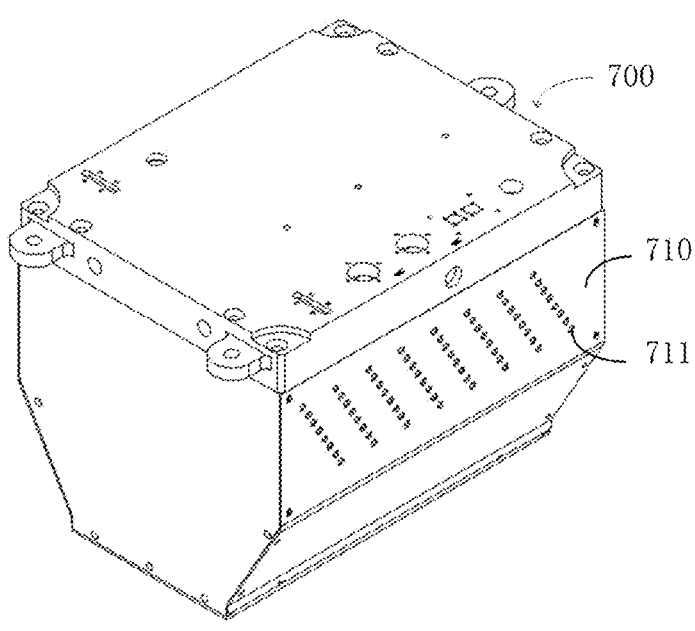
FIG. 10 is a schematic view of a partial structure of a print head mechanism according to one embodiment of the present disclosure.
Figure 11:
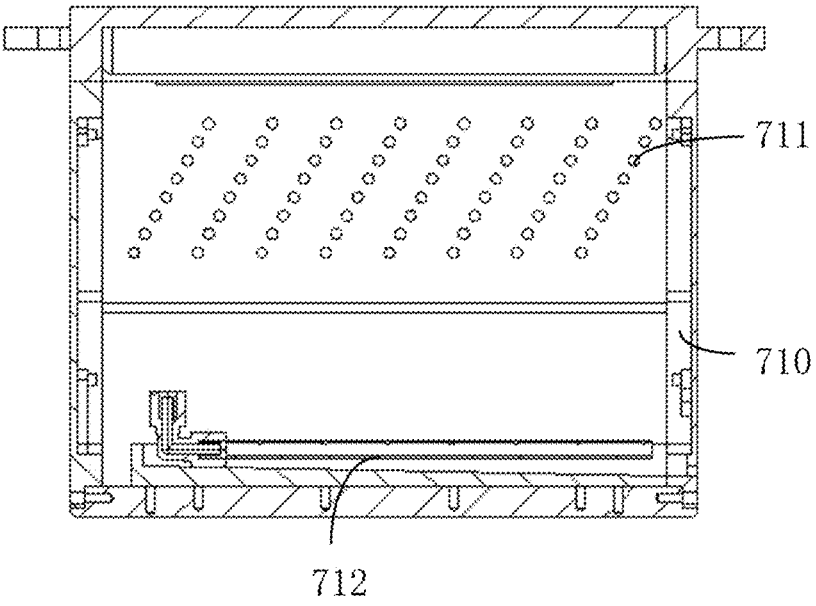
FIG. 11 is a sectional view of FIG. 10.
Figure 12:
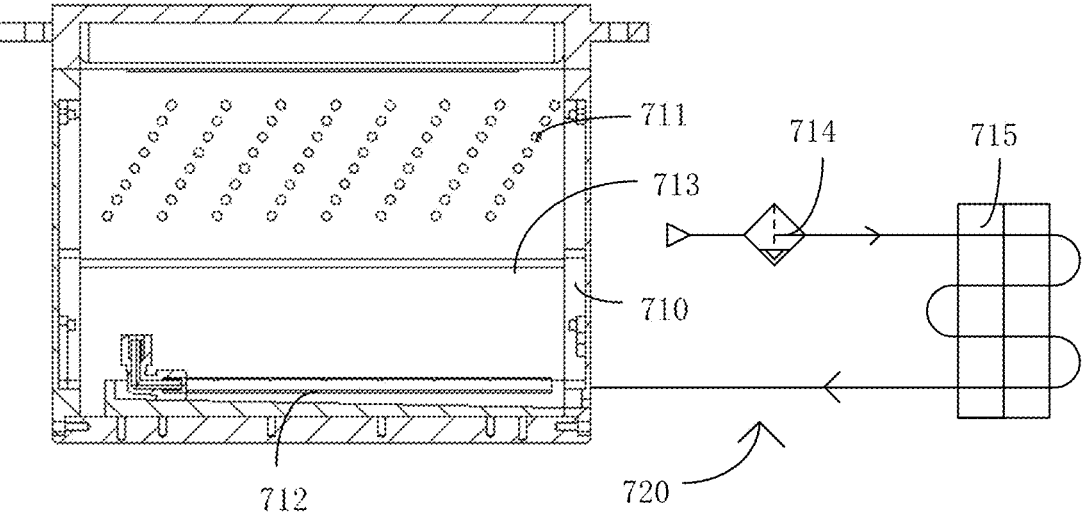
FIG. 12 is a schematic diagram of a portion of a 3D printing device according to one embodiment of the present disclosure.

In an embodiment, the 3D printing device includes a print head mechanism 700 and a gas source processing mechanism 720. The print head mechanism 700 includes a housing 710. The housing 710 is provided with an accommodating cavity 713. The housing 710 is provided with an exhaust portion 711 communicating with the accommodating cavity 713. Referring to FIGS. 10-12, the gas source processing mechanism 720 includes a particle separating device 714, a refrigeration device 715, and an equalizing device 712. The equalizing device 712 is disposed in the accommodating cavity 713. The equalizing device 712 is disposed in the accommodating cavity 713. The particle separating device 714, the refrigeration device 715, and the equalizing device 712 are connected in turn. The particle separating device 714 is used for filtering particles in the gas. The refrigeration device 715 is used for cooling the gas. The equalizing device 712 is used for conveying the processed gas into the accommodating cavity 713.

In the specific working process, the gas is first passed into the particle separating device 714; the particle separating device 714 filters out the powder and other particles in the gas; the filtered gas passes through the refrigeration device 715, and the refrigeration device 715 cools the gas, so that the temperature of the gas passing through the accommodating cavity 713 is lower; and finally, the gas after multiple treatments is transported through the equalizing device 712 to the accommodating cavity 713, so as to cool down the components in the accommodating cavity 713. Accordingly, during the above-described working process, the exhaust portion 711 of the housing 710, which is connected to the accommodating cavity 713, can discharge the excess gas in the accommodating cavity 713, so as to avoid excessive internal air pressure, which leads to deformation of the housing 710.

From the foregoing, in this embodiment, the gas source processing mechanism 720 is used to inject gas after multiple treatments into the print head mechanism 700, which can not only play a cooling effect on the internal environment of the print head mechanism 700, but also filter impurities in the gas to ensure that the working parts in the print head mechanism 700 are not affected by the dust. Moreover, the exhaust portion 711, which is connected with the accommodating cavity 713, can ensure the air fluidity within the print head mechanism 700 while also avoiding external dust from entering the print head mechanism 700, and also avoiding opening a plurality of heat dissipation holes on the housing 710, so as to ensure the sealing of the print head mechanism 700 and improve the service life of the print head mechanism 700.

In an embodiment, the 3D printing device includes a working box 800, a printing base plate 810, and a lifting mechanism 900. The printing base plate 810 is movably disposed in the working box 800. The lifting mechanism 900 is drivably connected to the printing base plate 810. The lifting mechanism 900 drives the printing base plate 810 to move up and down in the working box 800 to realize a specific printing work. The lifting mechanism 900 is a screw transmission mechanism, a belt transmission mechanism, and a linear motor, but not limit it.

Further, the lifting mechanism 900 is detachably connected with the printing base plate 810. In the printing process, the lifting mechanism 900 drives the printing base plate 810 up and down to lay the powder layer by layer. After the printing is completed, the lifting mechanism 900 is controlled to detach from the printing base plate 810, so as to move the printing tool on the printing base plate 810 to the next step of the work process. This method facilitates the whole process of the printing tool to improve the printing efficiency. The lifting mechanism 900 and the print base plate are detachably connected by snap connection, bolt connection, magnetic connection, but not limited to it.

Figure 13:
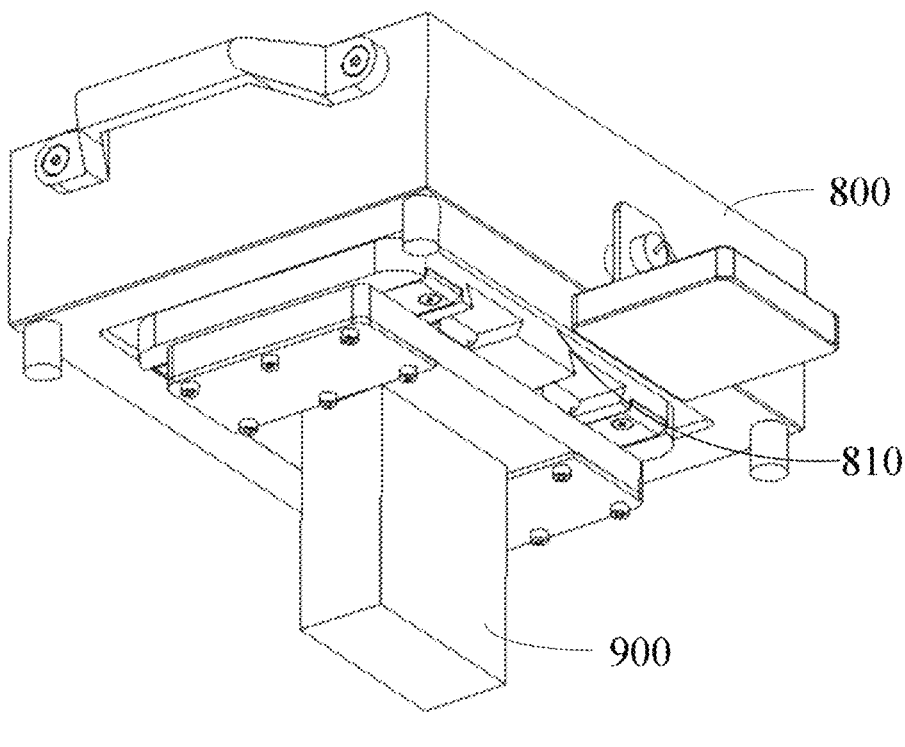
FIG. 13 is a schematic diagram of a partial structure of a 3D printing device according to one embodiment of the present disclosure.

In an embodiment, the 3D printing device includes a working box 800 and a lifting mechanism 900. Referring to FIG. 13, the lifting mechanism 900 is provided with a positioning member. The positioning member is provided with a first connecting member. A second connecting member is provided at the bottom of the working box 800. The first connecting member is matched and connected to the second connecting member. Optionally, one of the first connecting member and the second connecting member is a dovetailed protrusion, and the other of the first connecting member and the second connecting member is a dovetailed groove, so that the positioning member on the lifting mechanism 900 and the working box 800 are connected via the dovetailed groove and the dovetailed protrusion, thereby realizing connection and facilitating that the working box 800 slides off from the positioning member, thereby further processing of the 3D printing parts in the working box 800. Of course, the first connecting member and the second connecting member can be matched in other ways.

Further, the side of the positioning member toward the working box 800 is provided with a locking member. In the case where the first connecting member and the second connecting member are matched and connected, the locking member is resiliently contacted with the bottom of the working box 800. Specifically, when the first connecting member and the second connecting member are matched and connected, the locking member abuts against the bottom of the working box 800 to ensure the connection stability of the first connecting member and the second connecting member, thereby improving the connection effect between the lifting mechanism 900 and the working box 800. At the same time, this method realizes that the working box 800 is directly connected to the lifting mechanism 900, so that the working box 800 can be directly driven to move, so as to be applicable to specific printing scenarios. The locking member is an elastic member, such as a spring, but not limit this.

Based on the 3D printing device in the embodiments of the disclosure, this disclosure further provides a 3D printing system. The 3D printing system includes the 3D printing device described in all the embodiments above, and further includes one or more of a sieving device, a mixing device, a drying device, a curing device, a powder cleaning device, and a sintering device. so that different devices are selected for the printing work according to the specific work scenarios and the performance of the printed products.

Further, when the 3D printing device includes the 3D printing device described in the embodiments above and the sieving device, the mixing device, the drying device, the curing device, the powder cleaning device, and the sintering device, the sieving device, the mixing device, the 3D printing device, the drying device, the curing device, the powder cleaning device, and the sintering device are sequentially equipped. In other words, the sieving device, the mixing device, the 3D printing device, the drying device, the curing device, the powder cleaning device, and the sintering device are sequentially equipped to form a 3D printing production line, in order to realize the whole process management in the printing process of the 3D printing products. The adjacent two devices can be connected through a movable device, for through the Automated Guided Vehicle (AGV) for the 3D printing product delivery, in order to facilitate better articulation of the various devices.

Specifically, the sieving device is used for automatic sieving of the powder, as well as has a heating function and a cooling function to meet the corresponding printing requirements. The mixing device is used for mixing the material. The 3D printing device is used for printing and molding the 3D printing products, including a powder adding device, a powder spreading device, an inkjet device, and a heating device. The drying device is used for drying the printing products. Then, the curing device is used for heating and curing the 3D printing products to enhance the performance of the products. The powder cleaning device is used for clearing the cured 3D printing products by lifting the cured 3D printing products. The powder cleaning device also includes a sieving and suction device so as to facilitate recycling of the powder. The sintering device is used for degreasing and sintering the 3D printing products to ultimately obtain the 3D printing products that meet the corresponding performance requirements.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. A powder spreading device, comprising:
 a device body;
 an adjustment assembly;
 and a dust removing mechanism;
 wherein the adjustment assembly is provided on a lower side of the device body; the adjustment assembly is configured to orient toward a powder spreading surface; the dust removing mechanism comprises a dust removal cover and a dust removal pipeline, the dust removal cover is disposed to cover the adjustment assembly, one end of the dust removal pipeline is communicated with the dust removal cover, and the other end extends to the outside of the device body; and
 the dust removing mechanism comprises a dust collection hood; the device body is provided with an opening opposite to the adjustment assembly; the dust collection hood is provided over the opening; and the dust collection hood is configured to extend towards the adjustment assembly through the opening.

2. The powder spreading device of claim 1, wherein the number of the adjustment assembly is two; two adjustment assemblies are provided on both sides of the device body, respectively; and the dust removing mechanism is covered over the two adjustment assemblies.

3. The powder spreading device of claim 2, further comprising:

a feeding mechanism configured for powder spreading;

wherein the feeding mechanism is provided on the device body; and the feeding mechanism is provided between the two adjustment assemblies.

4. The powder spreading device of claim 1, wherein the adjustment assembly comprises a compaction member and a leveling member; and the compaction member and the leveling member are arranged spaced apart in sequence in a powder spreading direction.

5. The powder spreading device of claim 4, wherein the leveling member is a scraper, a first brush, a second brush, or a first roller; and the compaction member is a second roller or a pressing plate.

6. The powder spreading device of claim 5, wherein the leveling member is the first roller; the compaction member is the second roller; a distance between the compaction member and the powder spreading surface is smaller than a distance between the leveling member and the powder spreading surface.

7. The powder spreading device of claim 6, wherein a circumferential surface of the first roller and the second roller is uneven.

8. The powder spreading device of claim 4, wherein the compaction member is a roller; and the leveling member is a scraper, a toothed member or a brush member.

9. The powder spreading device of claim 1, further comprising:

a feeding mechanism;

wherein the feeding mechanism comprises a powder trough and a feeding portion; the feeding portion is provided in the powder trough, with a powder inlet mouth facing the feeding portion; and the feeding portion is disposed opposite to a powder outlet mouth of the powder trough.

10. The powder spreading device of claim 9, wherein the feeding portion is a spiral member; the spiral member is rotatably provided in the powder trough; and the spiral member is configured to extend along a lengthwise direction of the powder outlet mouth.

11. The powder spreading device of claim 10, wherein the spiral member comprises a first section and a second section connected to each other; the first section is helically oriented in an opposite direction to the second section; and the powder inlet mouth is oriented towards a junction of the first section and the second section.

12. The powder spreading device of claim 1, further comprising:

a feeding mechanism;

wherein the feeding mechanism is provided with a powder outlet mouth facing the powder spreading surface; and the powder outlet mouth is provided with a sieve mesh.

13. The powder spreading device of claim 1, further comprising:

a roller screen and a feeding mechanism;

wherein the roller screen is movably provided on the device body; the roller screen is configured to face the powder spreading surface; the feeding mechanism is configured to feed powder to the roller screen; and the roller screen is movable to lay the powder on the powder spreading surface.

14. A three-dimensional (3D) printing device, comprising:

the powder spreading device of claim 1.

15. The 3D printing device of claim 14, further comprising:

a print head mechanism and a gas source processing mechanism;

wherein the print head mechanism comprises a housing; and the housing is provided with an accommodating cavity and an exhaust portion communicated to the accommodating cavity; and the gas source processing mechanism comprises a particle separating device, a refrigeration device and an equalizing device; the equalizing device is provided in the accommodating cavity; the particle separating device, the refrigeration device and the equalizing device are connected in turn; the particle separating device is configured for filtering particles in gas; the refrigeration device is configured for refrigerating the gas;

and the equalizing device is configured for conveying a processed gas into the accommodating cavity.

16. The 3D printing device of claim 15, further comprising:

a working box;

a printing base plate; and a lifting mechanism;

wherein the printing base plate is movably provided in the working box; the lifting mechanism is drivably connected to the printing base plate; and the lifting mechanism is configured to drive the printing base plate to move up and down in the working box.

17. A 3D printing system, comprising:

the 3D printing device of claim 16; and at least one of a sieving device, a mixing device, a drying device, a curing device, a powder cleaning device and a sintering device.

* * * * *